United States Patent [19]

Lewchalermwong

[11] Patent Number: 4,725,382

[45] Date of Patent: Feb. 16, 1988

[54] FIRE RETARDANT COMPOSITION

[75] Inventor: C. Charles Lewchalermwong, Charlotte, N.C.

[73] Assignee: Chemical Specialties, Inc., Valdosta, Ga.

[21] Appl. No.: 848,843

[22] Filed: Apr. 3, 1986

Related U.S. Application Data

[63] Continuation of Ser. No. 601,976, Apr. 19, 1984, abandoned.

[51] Int. Cl.⁴ .................. C09K 21/00; C09D 5/18; B27N 9/00
[52] U.S. Cl. .................. 252/607; 106/18.13; 106/18.15; 106/18.16; 106/18.17; 106/18.3; 106/18.31; 106/18.32; 252/602; 252/603; 252/608; 252/7; 428/920; 428/921
[58] Field of Search .............. 252/601, 602, 607, 608, 252/609, 603, 7; 106/15.05, 18.11, 18.13, 18.14, 18.15, 18.16, 18.3, 18.31, 18.32; 260/DIG. 24; 428/920–921, 907, 911; 169/45

[56] References Cited

U.S. PATENT DOCUMENTS

| | | | |
|---|---|---|---|
| 1,030,909 | 7/1912 | Mesturino | 252/2 |
| 1,382,618 | 6/1921 | Blenio | 252/607 |
| 1,793,357 | 2/1931 | Brown | 252/607 |
| 2,386,471 | 10/1941 | Jones et al. | 167/38.5 |
| 2,526,083 | 10/1950 | Nielsen | 106/15.05 |
| 2,538,199 | 1/1951 | Jefferson et al. | 252/88 |
| 2,901,427 | 8/1959 | Steppe | 252/5 |
| 2,901,428 | 8/1959 | Schulenberg | 252/7 |
| 2,935,471 | 5/1960 | Aarons et al. | 252/8 |
| 3,223,649 | 12/1965 | Langguth | 252/389 |
| 3,245,904 | 4/1966 | Young | 252/7 |
| 3,257,316 | 6/1966 | Langguth et al. | 252/2 |
| 3,475,199 | 10/1969 | Wolf | 252/606 |
| 3,955,987 | 5/1976 | Schaar et al. | 252/7 |
| 4,038,451 | 7/1977 | Brown et al. | 428/274 |
| 4,442,157 | 4/1984 | Marx et al. | 252/606 |
| 4,539,045 | 9/1985 | Wagner | 106/18.13 |
| 4,595,414 | 6/1986 | Shutt | 106/18.16 |

OTHER PUBLICATIONS

Chemical and Engineering News, pp. 36–37, (Feb. 20, 1984).

Primary Examiner—Stephen J. Lechert, Jr.
Assistant Examiner—Howard J. Locker
Attorney, Agent, or Firm—Timothy R. Kroboth

[57] ABSTRACT

A fire retardant composition that utilizes pH control to lower corrosion is provided. The fire retardant composition contains $B_2O_3$, $P_2O_5$ and $NH_3$. Also provided is a fire retarded material of low corrosiveness.

18 Claims, 1 Drawing Figure

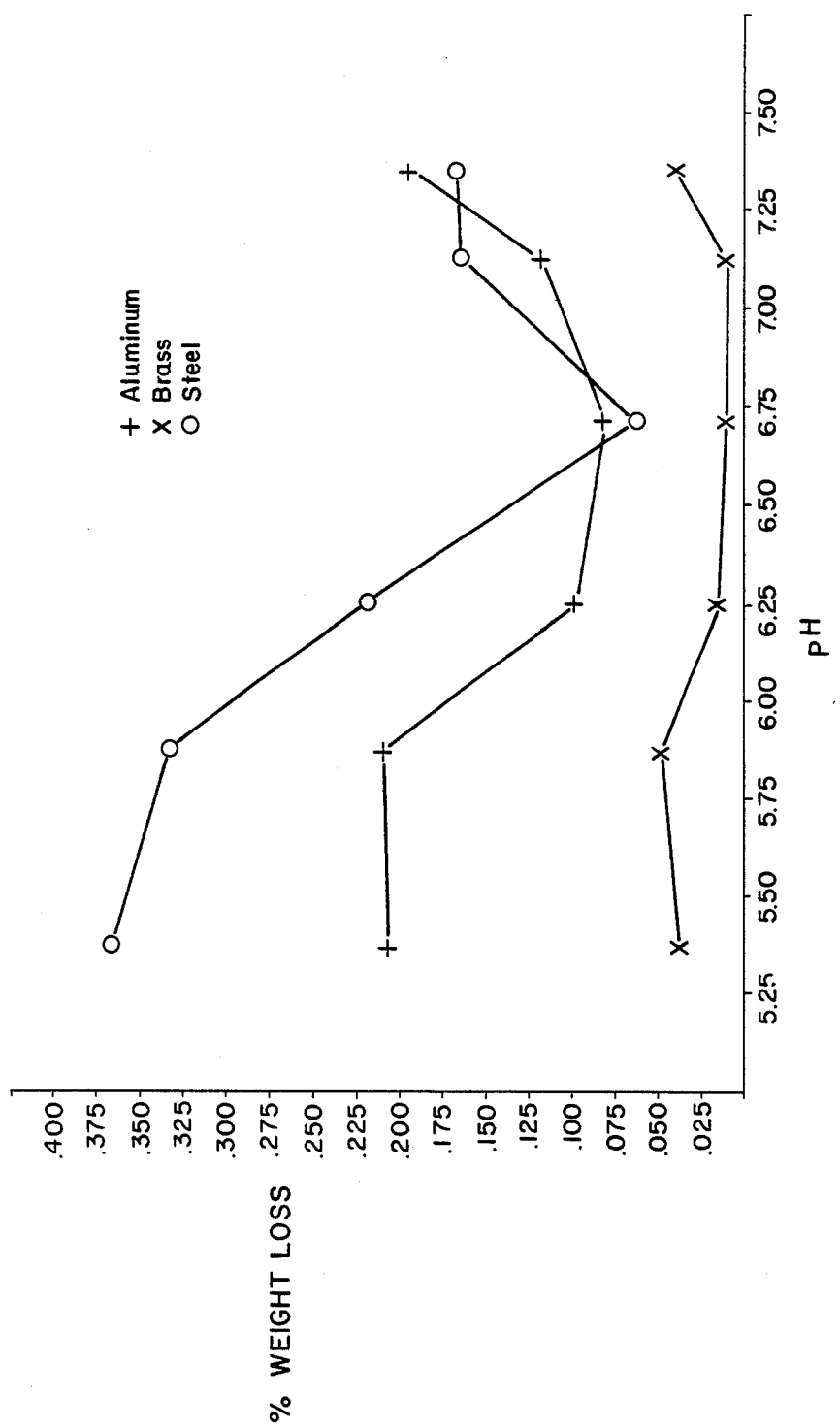

FIRE RETARDANT COMPOSITION

This application is a continuation of application Ser. No. 601,976, filed Apr. 19, 1984 now abandoned.

TECHNICAL FIELD

The present invention relates to a fire retardant composition. More specifically, this invention relates to a water soluble fire retardant composition that affords a fire retarded material of low corrosiveness, and to this fire retarded material.

BACKGROUND ART

The corrosiveness of a material treated with a fire retardant composition is a problem that has long needed a solution. This problem is of prime importance to the construction industry, which uses steel fasteners with fire retarded wood. Hence, by production of a fire retarded wood with low corrosion, the integrity of a structure made using this wood will not be undermined by corrosion failure of the steel fasteners.

Aqueous solutions of phosphate salts containing a corrosion inhibitor are known. These corrosion-inhibited solutions are illustrated by U.S. Pat. No. 3,223,649 to Langguth and U.S. Pat. No. 3,257,316 to Langguth et al.

Prior art fire retardant compositions containing water soluble sources of $P_2O_5$ and $NH_3$ are exemplified by U.S. Pat. No. 3,245,904 to Young and U.S. Pat. No. 4,038,451 to Brown et al. Young describes non-corrosive and corrosive solutions of his compositions, and Brown et al state that the compositions thereof tend to be less hygroscopic than prior art compounds and are less corrosive in metal containers.

Fire retardant compositions that additionally contain a water soluble source of $B_2O_3$ are illustrated by U.S. Pat. No. 1,030,909 to Mesturino, U.S. Pat. No. 1,382,618 to Blenio, U.S. Pat. No. 1,793,357 to Brown, U.S. Pat. No. 2,386,471 to Jones et al, U.S. Pat. No. 2,526,083 to Nielsen, U.S. Pat. No. 2,538,199 to Jefferson et al, U.S. Pat. No. 2,901,427 to Steppe and U.S. Pat. No. 2,935,471 to Aarons et al. Blenio describes a composition that typically contains sulfuric acid, but may in one embodiment contain phosphoric acid, boracic acid and a neutralizing amount of ammonia. Jones et al state that the formulation thereof should be non-hygroscopic and should not cause excessive rusting or corrosion of nails or other metal parts. Nielsen states that treated vegetable products obtained by use of his composition exhibit practically no corrosive effects to ferrous metals placed in contact with the treated materials. The Jefferson et al patent is directed to a liquid dust catching adhesive composition that includes a component that imparts smoke and flame resistance, that is preferably a mixture of phosphoric and boric acids containing at least 50 wt. % phosphoric acid, and that may additionally include a neutralizing base that may be ammonia. Aarons et al describe a formulation containing a water-soluble alkali metal borate or boric acid, a weakly basic, water-soluble nitrogenous compound, and at least one ammonium salt that may be diammonium phosphate or monoammonium phosphate.

Also known is a flame retardant ammonium pentaborate that is said to be non-corrosive to copper, steel and aluminum. This compound is disclosed in *Chemical and Engineering News*, pp. 36–37 (Feb. 20, 1984).

Although certain presently available fire retardant compositions show improvement with respect to corrosiveness to metals, there is a need for a water soluble fire retardant composition that will afford a fire retarded material, in particular fire retarded wood, of low corrosiveness by using pH control, not a corrosion inhibitor, to lower corrosion. For purposes of this description of my invention, by the term "low corrosiveness" is meant that corrosiveness of the fire retarded material to a metal such as steel, brass or aluminum is less than the corrosiveness of the same material treated with the flame retardant composition of Example 1 of the Aarons et al patent without the corrosion-inhibiting dicyandiamide component thereof. Thus, the discovery of such a fire retardant composition would constitute a significant contribution to the art. Such a composition would contribute even further to the art if it were less corrosive to steel equipment than to more expensive brass equipment, as steel equipment could be used in preparing a fire retarded material.

SUMMARY OF THE INVENTION

It is accordingly an object of the present invention to provide a water soluble fire retardant composition that will afford a fire retarded material of low corrosiveness by utilizing pH control, not a corrosion inhibitor, to lower corrosion.

It is a further object to provide a fire retardant composition of this type that is less corrosive to steel equipment than to more expensive brass equipment.

It is an even further object to provide a fire retarded material of low corrosiveness by utilizing pH control, not a corrosion inhibitor, to lower corrosion.

Additional objects, advantages and novel features of the present invention are set forth in the description that follows, and in part will become apparent to those skilled in the art upon examination of the following description or may be learned by practice of the invention.

To achieve the foregoing objects and in accordance with the purpose of the present invention, as embodied and broadly described herein, there is provided a water soluble fire retardant composition. This composition contains $B_2O_3$, $P_2O_5$ and $NH_3$ intermixed in such proportions as provide a pH of about 6.0–7.25 when formulated as an aqueous solution of about 5 wt. % $P_2O_5$. This fire retardant composition produces a fire retarded material of low corrosiveness without the addition of a corrosion inhibitor. Furthermore, this composition is free of an amount of a hygroscopic compound sufficient to otherwise prevent the fire retarded material from being of low corrosiveness.

Also provided by the present invention is a fire retarded material having applied thereto an amount of this composition sufficient to provide the material with flame retardance. This fire retarded material is of low corrosiveness.

In the drawing I have shown the surprising correlation between pH and corrosiveness that I have discovered for certain proportions of $B_2O_3$, $P_2O_5$ and $NH_3$. Although this drawing shows this relationship for one particular embodiment of my invention, it is to be understood that certain other sources of $B_2O_3$, $P_2O_5$ and $NH_3$ may be used to produce this correlation. These details are set forth in the detailed description that follows.

BRIEF DESCRIPTION OF THE DRAWING

Reference is now made to the accompanying drawing which forms a part of the specification of the present invention, and which shows the correlation between pH and corrosiveness that I have discovered for $B_2O_3$, $P_2O_5$ and $NH_3$ mixtures.

DETAILED DESCRIPTION OF THE INVENTION

It is intended that this invention produce a material that is fire retarded. Furthermore, it is intended that the fire retarded material be of low corrosiveness, especially to steel. Beneficially, this low corrosiveness is achieved without the addition of a corrosion inhibitor. This particular feature of the present invention is most advantageous since a large amount of inhibitor may be required to produce a fire retarded material of low corrosiveness when other fire retardant compositions are employed. Instead of incorporating corrosion inhibitors, this invention utilizes pH control to lower corrosion. pH control is effected by altering the constituent concentrations such that a pH within the desired range is produced.

I have now surprisingly discovered that a certain combination of $B_2O_3$, $P_2O_5$ and $NH_3$ provides a useful fire retardant composition that produces a fire retarded material of low corrosiveness. An essential characteristic of this combination is that it has a pH of about 6.0-7.25 when formulated as an aqueous solution of about 5 wt. % $P_2O_5$. As explained above, low corrosiveness is obtained without the addition of a corrosion inhibitor. I believe that of the three essential constituents of my fire retardant composition, the $B_2O_3$ is responsible for the low corrosiveness produced.

I have found that typically a mixture of about 5-23 wt. % $B_2O_3$, about 32-51 wt. % $P_2O_5$, and about 11-23 wt. % $NH_3$ yields a pH of about 6.0-7.25 when mixed with water to form an aqueous solution containing about 5 wt. % $P_2O_5$. Preferably, the mixture contains a ratio of about 1 part of $B_2O_3$ to about 2.9 parts of $P_2O_5$, and hence preferably contains about 11-17 wt. % $B_2O_3$.

The sources of $B_2O_3$, $P_2O_5$, and $NH_3$ will usually be inorganic water soluble compounds. For purposes of this description of my invention, by "water soluble" I mean to include slight solubility in water and to exclude insolubility in water. An important fact to be understood in regard to water solubility is that a $P_2O_5$-providing compound will usually increase the water solubility of a $B_2O_3$-providing compound.

Suitable $P_2O_5$-providing compounds include, but are not limited to, phosphoric acid and an ammonium phosphate such as diammonium phosphate and monoammonium phosphate. Conveniently, an ammonium phosphate is used since it also provides $NH_3$ to the formulation. Combinations of $P_2O_5$-providing compounds may be used. For example, diammonium phosphate and monoammonium phosphate may be used together. Other useful sources of $NH_3$ include, but are not limited to, ammonium borate and ammonia gas. Exemplary compounds for providing $B_2O_3$ include, but are not limited to, boric acid, boron oxide and ammonium borate. Boric acid is a preferred source of $B_2O_3$. Mixtures of $NH_3$ sources, and mixtures of $B_2O_3$ sources may be used.

Hygroscopic organic or inorganic compounds should be avoided as ingredients in my fire retardant composition. However, a hygroscopic compound could be present in an amount that would not prevent the fire retarded material made with my fire retardant composition, from being of low corrosiveness. Such an amount would typically be a trace amount. Exemplary hygroscopic compounds include, but are not limited to, sodium salts such as borax and sodium phosphate, and sulfates. Also, urea, which is a very corrosive compound, and ammonium sulfamate, which may be corrosive, should be avoided.

Conveniently, the fire retardant composition of the present invention is made by mixing together monoammonium phosphate, diammonium phosphate and boric acid. Generally, in this case, the composition will be formulated from about 9-40 parts of boric acid and about 60-91 parts of monoammonium phosphate and diammonium phosphate, with the monoammonium salt ranging from about 0-38 parts and the diammonium salt ranging from about 25-82 parts. In preparing the composition from these three ingredients, the proportions of the ingredients are selected so as to provide a pH of about 6.0-7.25 when formulated as an aqueous solution containing about 5 wt. % $P_2O_5$. Attention is now invited to the accompanying drawing, which illustrates the surprising correlation between pH and corrosiveness that I have discovered for a composition containing $B_2O_3$, $P_2O_5$ and $NH_3$. This correlation is illustrated by a fire retardant composition made by mixing together monoammonium phosphate, diammonium phosphate and boric acid.

When the fire retardant composition of the present invention is produced by intermixing $B_2O_3$, $P_2O_5$ and $NH_3$ in such proportions as provide a pH of about 7.1 as an upper limit, a preferred composition results. A more preferred composition is made by intermixing these three constituents in such proportions as provide a pH of about 6.25-7.0 when the composition is formulated as an aqueous solution containing about 5 wt. % $P_2O_5$. A highly preferred composition results when the proportions provide a pH of about 6.7-6.95. When this highly preferred composition is made using monoammonium phosphate and diammonium phosphate, the mole ratio of the monoammonium salt to the diammonium salt is about 1:4.

A useful commercial formulation of my fire retardant composition is an aqueous concentrate containing about 40 to 60 wt. %, preferably about 50 wt. %, solids, that is, containing about 40 to 60 wt. % of a mixture of about 5-23 wt. % $B_2O_3$, about 32-51 wt. % $P_2O_5$, and about 11-23 wt. % $NH_3$. The aqueous concentrate may be used simply by dilution with water to about 5 wt. % $P_2O_5$.

It is generally desirable for the fire retardant composition of the present invention to contain a fungicide, as a fungicide will prevent phosphate mold. Furthermore, when this composition is used to prepare fire retarded wood, the fungicide will prevent wood mold. If a fungicide is used, it is essential that it be non-corrosive. Useful non-corrosive fungicides include, but are not limited to, cupraammonium acetate complex, which is described in U.S. Pat. No. 3,900,504. Conventional amounts of the fungicide will be used.

As explained earlier, my invention achieves low corrosiveness by pH control, rather than by the addition of a corrosion inhibitor. However, it is conceivable that in certain instances a corrosion inhibitor may be added with a beneficial effect, that is, the fire retarded material is even less corrosive.

As indicated above, the fire retardant composition of the present invention, which is in dry mix form, may be prepared for use simply by dissolution thereof in sufficient water to provide an aqueous treating solution containing about 5 wt. % $P_2O_5$. The fire retardant composition will typically be applied to a flammable material so as to make it fire retarded. Generally, a cellulosic material will be treated. Exemplary cellulosic materials include, but are not limited to, wood such as fresh cut or unseasoned wood and plywood, wood fiber, straw, sawdust, wood flour, paper, cotton fibers and cotton textiles. Conveniently, the fire retardant composition will be applied by immersion of the material in the aqueous treating solution until the material no longer absorbs the solution. This method of treatment will provide a high degree of flame retardance. Regardless of the method of treatment, the product obtained should be provided with a sufficient concentration of the solution so that it will not propagate a flame and will ignite with difficulty at the point of contact with an igniting flame.

The treatment of wood to render it fire retarded, is carried out by impregnating the wood with the treating solution. Advantageously, the conventional full cell process is employed. In this process, the wood is subjected to a vacuum equivalent to about 22–28 inches of mercury to remove air from the wood cells, and the treatment cylinder is filled under vacuum with the treating solution and the pressure is increased to about 60 to 160 psi and held until the wood does not appear to be taking up any more of the treating solution.

In evaluating the fire retarded wood of the present invention for corrosiveness, I have discovered that the wood is less corrosive to brass than to either steel or aluminum. Furthermore, I have found that the wood is less corrosive to aluminum than steel, except that at a pH of about 6.65 to about 6.8 it is less corrosive to steel than to aluminum. In contrast, I have surprisingly discovered that the treating solution is less corrosive to steel equipment than to brass equipment. This characteristic beneficially permits the use of less expensive steel equipment in preparing a fire retarded material.

I have also found that the fire retarded wood has about the same hygroscopicity as untreated wood. This characteristic is in contrast to the typical substantial increase in hygroscopicity that results from impregnating wood with salts. Specifically, I found that the fire retarded wood had a value of about 14.5 and the untreated wood had a value of about 13.6 after being subjected to 80% relative humidity at about 35° C. for about two weeks. I believe that this lack of substantial increase in hygroscopicity correlates with the low corrosiveness of the fire retarded wood.

As indicated earlier, a further advantage of my fire retardant composition is that it is water soluble at ambient conditions. Therefore, no unusual method is required to produce an aqueous treating solution. The treating solution may also be prepared by simply diluting the aqueous concentrate.

Another advantage of my invention is that neither the aqueous concentrate nor the treating solution has an apparent unpleasant or irritating odor. Moreover, wood which has been treated with the solution and kiln dried, is free of any unpleasant or irritating odor.

An additional advantage of my invention is that wood, which has been treated with the solution, needs only to be dried in a kiln in the usual manner. No unusually high temperature is required to cure the wood. Thus, the structural strength of the wood is not compromised. Once treated and kiln dried, no other procedure is required to activate the fire retardancy.

A further beneficial aspect of my invention is that after the treating solution has been properly applied and dried, the treated wood does not show any chemical exudation when exposed to a high relative humidity environment. Also, wood, to which the treating solution (within the required pH range) has been applied, and which has been thereafter kiln dried, shows no appreciable color change or deviation from the untreated texture that might interfere with the aesthetic value of the wood.

Some conventional fire retardants for wood contain an amount of suspected cancer causing agents. My invention does not contain any compound that is currently suspected of causing cancer. Accordingly, handling, storage and clean-up of the fire retardant composition of the present invention, can be carried out with substantial safety.

In the examples that follow and throughout this description and the claims set forth below, all percentages are by weight, all pH values are at 25° C, and all procedures are carried out at ambient temperature and pressure, unless otherwise specified.

Example 1

A dry mix is prepared from 58 parts of diammonium phosphate (DAP), 13 parts of monoammonium phosphate (MAP), and 29 parts of boric acid. Then one part of the dry mix is dissolved in about 10 parts of water. The pH of the resulting solution is 6.8. Six samples of Southern yellow pine ($\frac{3}{8}"\times\frac{3}{4}"\times 40"$), which have been treated with this solution using the full cell process, are subjected to fire tube tests (all determinations and test equipment are calibrated according to the procedure of ASTM E 69-50). After the pilot flames are removed, the flame is out immediately and no evidence of significant progressive combustion is found. The average weight loss for the six samples is 23.3%.

EXAMPLE 2

MAP (109 grams), DAP (322 grams) and boric acid (48 grams) are dissolved in 11520 grams of water. The pH of the resulting solution is 6.92. Six additional samples of Southern yellow pine are evaluated using this solution in accordance with the treatment and fire tube test carried out in Example 1. The average weight loss is 20.9%.

EXAMPLE 3

MAP (2.3 lbs.), DAP (10.7 lbs.) and boric acid (4.8 lbs.) are mixed to a well blended mixture. About 30 pints of water is added to the mix. The pH of the resulting solution is 6.79. Six samples of AC-Fir Plywood are evaluated using this solution in accordance with the treatment and fire tube test carried out in Example 1. The average weight loss is 21.1%.

EXAMPLES 4-6

MAP, DAP and boric acid are mixed together in accordance with the amounts required by the Table, and then each dry mix is dissolved in sufficient water to form an aqueous solution containing 5 wt. % $P_2O_5$. The pH of each of the three resulting solutions is shown in the Table (at 25° C.).

Each solution is used to treat a $1"\times 1"\times 48"$ piece of Southern yellow pine wood. The treatment consists of subjecting the piece of wood to a vacuum for 5 minutes, and thereafter immersing the wood in the treating solution and subjecting it to 60 psi for 20 minutes. The treated piece of wood is then cut into $1'' \times 1'' \times 2''$ sections for corrosion testing.

Corrosiveness of the fire retarded wood is evaluated using MIL-L-19140C. Metal coupons of SAE 1010 steel, 70-30 brass and 2024-T3 aluminum alloy with dimensions of $1 \times 2 \times 1/16$ inches are used, and duplicate testing is conducted with each of these metals. Each metal coupon is sandwiched between two fire retarded $1'' \times 1'' \times 2''$ sections of wood, which are conditioned constantly in a humidified chamber for 10 days at 49° C. $\pm 1°$ C. and at a relative humidity of 90% $\pm 1\%$. Prior to testing, each metal coupon is cleaned with garnet sandpaper and washed with an acetone-alcohol mixture, after which it is dried and weighed. The metal coupon/wood sandwich is wrapped with a rubber band to insure metal/wood surface contact. After the ten day period is complete, each metal coupon is thoroughly cleaned, washed under running water and brushed lightly to remove any loose corrosion. Then the remaining corrosion is removed by immersing aluminum in 10% nitric acid, brass in 25% hydrochloric chloric acid, and steel in 10% ammonium citrate solution. After a final rinsing with water and drying, each metal coupon is reweighed, and the percentage weight loss is calculated. The results are shown in the Table, and set forth in the drawing.

TABLE

| | MAP/DAP (moles) | Boric Acid (moles) | pH | % Weight Loss (Ave.) | | |
|---|---|---|---|---|---|---|
| | | | | Aluminum | Brass | Steel |
| Example 4 | 4.50/6.75 | 7.75 | 6.24 | 0.098 | 0.016 | 0.220 |
| Example 5 | 2.25/9.00 | 7.75 | 6.70 | 0.082 | 0.012 | 0.065 |
| Example 6 | 0.87/10.40 | 7.75 | 7.11 | 0.120 | 0.013 | 0.167 |
| Comparative Example 1 | 9.00/2.25 | 7.75 | 5.36 | 0.205 | 0.039 | 0.368 |
| Comparative Example 2 | 6.75/4.50 | 7.75 | 5.86 | 0.210 | 0.049 | 0.335 |
| Comparative Example 3 | 0/11.25 | 7.75 | 7.33 | 0.197 | 0.042 | 0.170 |

COMPARATIVE EXAMPLES 1-3

Following the procedure of Examples 4-6, except that MAP, DAP and boric acid are mixed together in accordance with the amounts required by the Table for these comparative examples, the data set forth in the Table are derived and have been included in the drawing.

The above examples are illustrative of the present invention. It is to be understood that these examples are not in any way to be interpreted as limiting the scope of the invention. Rather, it is intended that the scope of the invention be defined by the claims set forth below. I contemplate that the invention as hereinafter claimed, will be subject to various modifications, which modifications are within the scope thereof.

I claim:

1. A water soluble fire retardant composition that utilizes pH control to afford a fire retardant material of low corrosiveness, said fire retardant composition being a dry mix that consists essentially of non-hydroscopic sources of $B_2O_3$, $P_2O_5$ and $NH_3$ that provide about 5-23 wt. % $B_2O_3$, about 32-51 wt. % $P_2O_5$, and about 11-23 wt. % $NH_3$; said non-hydroscopic source of $NH_3$ further being a water soluble, inorganic compound other than ammonium sulfamate; said non-hygroscopic sources being intermixed in such proportions as provide a pH of about 6.7-6.95 when formulated as an aqueous treating solution containing about 5 wt. % $P_2O_5$.

2. The fire retardant composition of claim 1, comprising about 11-17 wt. % $B_2O_3$.

3. The fire retardant composition of claim 1, comprising boric acid, monoammonium phosphate and diammonium phosphate.

4. The fire retardant composition of claim 1, further comprising a non-corrosive fungicide in a fungicidally effective amount.

5. The fire retardant composition of claim 1, wherein said non-hygroscopic sources of $B_2O_3$ and $P_2O_5$ are water soluble inorganic compounds.

6. The fire retardant composition of claim 1, wherein said non-hygroscopic source of $NH_3$ is an ammonium phosphate, ammonium borate, a mixture of ammonium phosphates, a mixture of ammonium borate and an ammonium phosphate, or a mixture of ammonium borate and said mixture of ammonium phosphates.

7. An aqueous concentrate comprising about 40 to 60 wt. % of a water soluble fire retardant composition that utilizes pH control to afford a fire retardant material of low corrosiveness, said fire retardant composition consisting essentially of non-hygroscopic sources of $B_2O_3$, $P_2O_5$ and $NH_3$ that provide about 5-23 wt. % $B_2O_3$, about 32-51 wt. % $P_2O_5$, and about 11-23 wt. % $NH_3$; said non-hygroscopic source of $NH_3$ further being a water soluble, inorganic compound other than ammonium sulfamate; said non-hygroscopic sources being intermixed in such proportions as provide a pH of about 6.7-6.95 upon dilution of said concentrate to form an aqueous treating solution containing about 5 wt. % $P_2O_5$.

8. The aqueous concentrate of claim 7, comprising about 50 wt. % of said fire retardant composition.

9. The aqueous concentrate of claim 7, wherein said fire retardant composition comprises about 11-17 wt. % $B_2O_3$.

10. The aqueous concentrate of claim 7, wherein said fire retardant composition further comprises a fungicidally effective amount of a non-corrosive fungicide.

11. The aqueous concentrate of claim 7, wherein said non-hygroscopic sources of $B_2O_3$ and $P_2O_5$ are water soluble inorganic compounds.

12. The aqueous concentrate of claim 7, wherein said non-hygroscopic source of $NH_3$ is an ammonium phosphate, ammonium borate, ammonia gas, a mixture of ammonium phosphate, or a mixture thereof.

13. A fire retardant wood of low corrosiveness and that is less corrosive to steel than to aluminum, said fire retardant wood being impregnated with an amount sufficient to provide flame retardance, of a water soluble fire retardant composition consisting essentially of non-hygroscopic sources of $B_2O_3$, $P_2O_5$ and $NH_3$ that provide about 5-23 wt. % $B_2O_3$, about 32-51 wt. % $P_2O_5$, and about 11-23 wt. % $NH_3$; and non-hygroscopic source of $NH_3$ further being a water soluble, inorganic compound other than ammonium sulfamate; and said non-hygroscopic sources being intermixed in such proportions as yield said fire retardant wood, which is less corrosive to steel than to aluminum.

14. The fire retardant wood of claim 13, wherein said non-hygroscopic sources of $B_2O_3$ and $P_2O_5$ are water soluble inorganic compounds.

15. The fire retardant wood of claim 13, wherein said non-hygroscopic source of $NH_3$ is an ammonium phosphate, ammonium borate, ammonium gas, a mixture of ammonium phosphates, or a mixture thereof.

16. The fire retardant wood of claim 13, wherein said fire retardant composition comprises about 11–17 wt. % $B_2O_3$.

17. The fire retardant wood of claim 13, wherein said fire retardant composition comprises boric acid, monoammonium phosphate and diammonium phosphate.

18. The fire retardant wood of claim 13, wherein said fire retardant composition further comprises a fungicidally effective amount of a non-corrosive fungicide.

* * * * *

UNITED STATES PATENT AND TRADEMARK OFFICE
CERTIFICATE OF CORRECTION

PATENT NO. : 4,725,382

DATED : February 16, 1988

INVENTOR(S) : C. Charles Lewchalermwong

It is certified that error appears in the above-identified patent and that said Letters Patent is hereby corrected as shown below:

Column 7, lines 63 and 66, change "non-hydroscopic" to "non-hygroscopic";

Column 8, line 50, change "phosphate" to "phosphates"; and

Column 9, line 1, change "ammonium" (second occurrence) to "ammonia".

Signed and Sealed this

Fourth Day of August, 1992

*Attest:*

DOUGLAS B. COMER

*Attesting Officer*  Acting Commissioner of Patents and Trademarks